Oct. 23, 1962  H. J. BOOTH ET AL  3,059,623
BOLTING ARRANGEMENT FOR RECIPROCATING MACHINERY
Filed Feb. 15, 1961
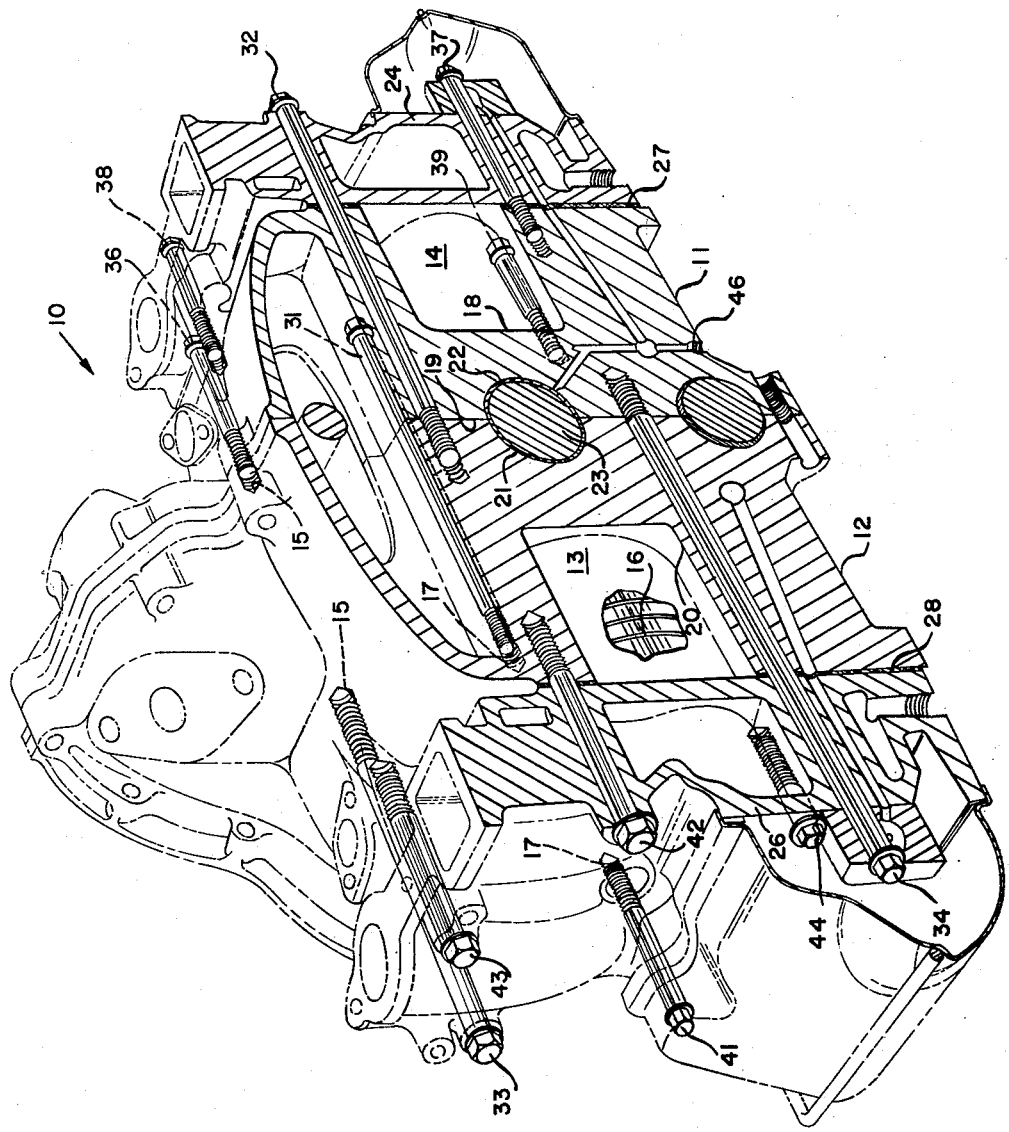
HARVEY J. BOOTH
ROBERT P. ERNEST
JAMES W. FOSTEY
INVENTORS
BY John C. Faulkner
Thomas H. Oster
ATTORNEYS United States Patent Office 3,059,623
Patented Oct. 23, 1962

3,059,623
BOLTING ARRANGEMENT FOR RECIPRO-
CATING MACHINERY
Harvey J. Booth, Grosse Ile, Robert P. Ernest, Detroit, and James W. Fostey, Dearborn, Mich., assignors to Ford Motor Company, Dearborn, Mich., a corporation of Delaware
Filed Mar. 15, 1961, Ser. No. 95,836
10 Claims. (Cl. 121—194)

This invention relates to bolting means. In particular it is concerned with a bolting arrangement applicable to opposed horizontal cylinder constructions embodying two separate cylinder blocks.

Opposed cylinder constructions, particularly internal combustion engines, are frequently designed to incorporate two piece cylinder blocks. The crankshaft is journaled in main bearings secured in the common abutting surfaces of the cylinder blocks. Designs of this type are conventionally held together by tie bolts which generally include the cylinder heads as well. Examples of constructions of this type may be found in United States Letters Patent Nos. 2,091,547 issued to J. H. Jolbert on August 31, 1937, and 2,713,852 issued to C. O. Trout on July 26, 1955.

There are some disadvantages to constructions utilizing the tie bolt principle. For example, tie bolts are generally quite long, and therefore are subject to excessive "stretch" after torquing. Tie bolts are likewise susceptible to "stretch" when subjected to explosion pressures of compressed gases in the cylinder heads. It is also possible for the explosion pressures from one bank of cylinders to cause the compression of the cylinder head gasket on the other bank of cylinders and result in a loss of head bolt torque and concomitant cylinder head gasket sealing.

Still a further disadvantage to tie bolt constructions is concerned with main bearing usage. Most internal combustion engines use main bearings made of two bearing sections having a rigid back and a soft inner liner of bearing material. These bearing sections are spread slightly in the parting plane. In order to fit properly in their seats, the projected height of the bearing sections is higher than the radius of the seat. When the bearing sections are secured in place, they are under compression. This compression or "crush fit" as it is sometimes referred to, tends to give the bearing good contact over the entire interface of the bearing sections and its seat, and consequently good heat flow between the two. There is also a natural tendency of the bearing sections to spread at the parting line upon being compressed thereby relieving the bearing sections at the parting line and preventing binding of the bearing sections at this point. If tie bolts are depended upon to hold the bearing sections in place, any "stretch" in the tie bolts can result in the loosening of the bearing sections resulting in bearing failure.

This invention is an improvement over devices using tie bolts. An embodiment of this invention is illustrated in an internal combustion engine of the horizontally opposed four cylinder type. In this particular embodiment two separate cylinder blocks are used having common abutting surfaces. Each cylinder block has a pair of cylinders and a pair of pistons reciprocating in the cylinders. A cylinder head closes off each end of the cylinders. Main bearings, comprising a pair of bearing sections, are mounted in the common abutting surfaces of the cylinder blocks. A crankshaft is journaled in the bearing sections for the usual rotational movement. The aforementioned parts are secured into a unitary assembly by long and short fastening means which may be in the form of studs, bolts, etc. Each of the short fastening means extends through the adjacent cylinder head and terminates in the adjacent cylinder block. Each of the long fastening means extends through the adjacent cylinder head, the adjacent cylinder block and terminates in the opposite cylinder block above or below each of the main bearings. The long and short fastening means associated with the same cylinder heads are staggered relative to each other. Furthermore, the same long and short fastening means are staggered relative to the long and short fastening means associated with the opposite cylinder head. The long and short fastening means associated with one cylinder head are concentrically and oppositely aligned but spaced apart with the long and short fastening means associated with the opposite cylinder head.

There are many advantages to this construction. A substantial reduction in both the fastening means length and "stretch" is accomplished. Furthermore, the staggered attachment permits a lesser number of parts to be assembled at one time. The explosion pressures of the cylinders on one bank do not result in the compression of the cylinder head gasket on the other bank. The loss of cylinder head fastening means torque and possible damage to the main bearings is substantially minimized.

Other objects and advantages of this invention will become more apparent when considered in connection with the single figure of the drawing which is a cross sectional perspective view, partly in section, taken through the center wall of a horizontally opposed four cylinder internal combustion engine, and showing the location of the fastening means in phantom.

Referring now to the single drawing in the case, a rear portion of a horizontally opposed four cylinder internal combustion engine is shown and indicated at 10. Engine 10 is comprised of adjacent but separate cylinder blocks 11 and 12. Cylinder blocks 11 and 12 are each provided with a pair of cylinders of which only the rear cylinders 13 and 14 of each cylinder block is shown. Cylinders 13 and 14 may have substantially parallel axes. A piston 16, shown in part, reciprocates in each of the cylinders in the well-known manner.

Cylinder blocks 11 and 12 are each provided with transversely extending vertical walls at the front (not shown) and in the rear (shown in part) at 15 and 17 and intermediate walls 18 and 20 shown in cross section. Intermediate walls 18 and 20 are cut away throughout most of the length of the cylinders 13 and 14 to provide an uninterrupted flow of coolant around the cylinders. The vertical walls, including intermediate walls 18 and 20, have common abutting surfaces indicated at 19 which includes the vertical walls 15, 17, 18 and 20.

Provision in the vertical walls of the common abutting surfaces 19 is made to receive a composite main bearing comprising bearing sections 21 and 22. Bearing sections 21 and 22 may be of the rigid back, soft inner liner bearing type, and sometimes referred to as a "crush type" bearing. It is so referred to because when properly anchored in place, the bearing sections 21 and 22 are under a compressive force so that good heat flow takes place between the bearing section and its mounting member or in this instance the intermediate walls 18 and 20. A crankshaft 23 is journaled in the bearing sections 21 and 22 with its axis in the common abutting surfaces 19. A cylinder head 24 and 26 and cylinder head gasket 27 and 28 close off each of the cylinders 13 and 14 respectively.

Referring now to the fastening means, long studs and short studs may be used. All of the long studs may be the same length. Likewise, all of the short studs may be of the same length. For the purpose of description the long studs are identified by reference numerals 31, 32 (associated with cylinder head 24) and 33, 34 (associated with cylinder head 26). The short studs for the purpose of identification are identified by reference numerals 36, 37, 38, 39 (associated with cylinder head 24), 41, 42 43 and 44 (associated with cylinder head 26). If the drawing had been completed with respect to the forward position of the cylinder head 24 and the cylinder block 11, additional short studs would be used in similar positions occupied by short studs 36, 38 and 39, and a long stud would be used in a similar position occupied by long stud 31. Likewise, if the drawing had been completed with respect to the forward portion of the cylinder head 26 and cylinder block 12, additional short studs would be used in similar positions occupied by short studs 41, 43 and 44, and a long stud would be used in the similar position of long stud 33. It is, of course, understood and contemplated that the number of each type of stud may vary with specific uses.

The attachment of the cylinder head 24 to the cylinder blocks 11 and 12 is accomplished in the following manner. Long stud 32 extends through the cylinder head 24, cylinder head gasket 27, cylinder block 11 and terminates in a threaded engagement with the intermediate wall 20 of the opposite cylinder block 12 above the bearing sections 21 and 22. Another long stud 31 extends through the cylinder head 24, cylinder head gasket 27, cylinder block 11 and terminates in a threaded engagement with the rear wall 17 of the opposite cylinder block 12 below the bearing sections (not shown). The third long stud (not shown) would be similar to long stud 31 but would terminate in the front wall (not shown) below the bearing sections (not shown). Putting the matter differently, the long studs 31 and 32 aer staggered. If a long stud terminates in the cylinder block wall above the bearing sections, the long stud in the next wall will terminate in the cylinder wall below the main bearing sections, and so on with the next succeeding wall.

The short stud 37 associated with the long stud 32 in a vertical plane merely extends through the cylinder head 24, cylinder head gasket 27 and terminates in a threaded engagement in the wall 18 of the adjacent cylinder block considerably short of the bearing sections. Short stud 36 associated with long stud 31 in a vertical plane likewise extends through the cylinder head 24, cylinder head gasket 27 but terminates in a threaded engagement in the wall 15 of the adjacent cylinder block 11. It is also considerably short of the bearing sections. The third short stud (not shown) would be similar to short stud 36 but would terminate in the front wall (not shown). The short studs 31 and 32, therefore, are also staggered so that there is, in essence, one long stud and one short stud associated with each wall of each of the cylinder blocks.

Additional short studs 38 and 39 are disposed above and below the cylinder 14 and help to further secure the cylinder head 24 to the cylinder block 11. There would be a pair of studs (not shown) for the same purpose with respect to the front cylinder (not shown).

Referring now to the opposite cylinder head 26, the short studs 41 and 42 are likewise staggered relative to long studs 33 and 34. All the short studs including short studs 43 and 44 extend through the cylinder head 26, cylinder head gasket 28 and terminate in adjacent cylinder block 12. Long studs 33 and 34 extend through the cylinder head 26, cylinder head gasket 28, cylinder block 12 and terminate in a threaded engagement in the walls of the opposite cylinder block 11. Long stud 33 terminates in cylinder wall 15 of cylinder block 11 above the bearing sections, while long stud 34 terminates in cylinder wall 18 of the cylinder block 11 below the bearing sections 21 and 22. The treatment of the additional three short studs and the additional one long stud for the cylinder head 26 and the cylinder block portions 12 (not shown) is staggered in the manner set forth with respect to cylinder head 24 and cylinder block 11.

It is to be noted that a further staggering takes place between the three long and three short studs associated with the securement of one of the cylinder heads to the cylinder block walls and the three long and three short studs associated with the securement of the other cylinder head to the cylinder block walls. For example, the long studs associated with cylinder head 24 are opposite and concentric but in spaced apart alignment with the short studs associated with the cylinder head 26. Furthermore, the short studs associated with cylinder head 24 are opposite and concentric but in spaced apart alignment with the long studs associated with cylinder head 26.

When looking at the drawing, long stud 32 is oppositely and concentrically aligned with short stud 42; short stud 37 oppositely and concentrically aligned with long stud 34; short stud 36 oppositely and concentrically aligned with long stud 33; and long stud 31 oppositely and concentrically aligned with short stud 41. Short studs 38 and 39 which are disposed above and below the cylinder 14 are oppositely aligned to short studs 43 and 44 disposed above and below cylinder 13.

It can be seen that the bearing sections 21 and 22 are securely held in place by long studs extending from opposite directions. One long stud is located above the bearing sections 21 and 22 while the other long stud is located below the bearing sections 21 and 22. The same relationship exists with respect to the securement of the cylinder blocks 11 and 12 about the other bearing sections which are not shown.

Because of the spaced apart relationship between the concentrically aligned studs, cylinder head gasket 27 is not affected by the explosion pressures of the opposite cylinder, and vice versa. Furthermore, a considerable saving in stud length is attained with its attendant benefits which include the provision of oil passages 46 in the intermediate wall 18.

Although the invention is particularly described with respect to a horizontally opposed internal combustion engine, it is, of course, understood that it may be used in compressors, steam engines or other comparable reciprocating machinery.

It will be understood that the invention is not to be limited to the exact construction shown and described, but that various changes and modifications may be made without departing from the spirit and scope of the invention as defined in the appended claims.

We claim:

1. A device for exchanging energy between a working fluid and at least a pair of reciprocating pistons, said pistons having substantially parallel azes and reciprocating in a pair of cylinders formed in adjacent but separate cylinder blocks, said cylinder blocks having common abutting surfaces, a crankshaft journaled with its axis in the common abutting surfaces of the cylinder blocks, a cylinder head closing off each of said cylinders, said cylinder blocks and cylinder heads being secured into a unitary assembly by at least two short fastening means and two long fastening means, each cylinder head being associated with a short fastening means and a long fastening means, each long fastening means extending through a cylinder head and the adjacent cylinder block and terminating within the opposite cylinder block, and each of the short fastening means extending through a cylinder head and terminating in the adjacent cylinder block.

2. A device for exchanging energy between a working fluid and at least a pair of reciprocating pistons, said pistons having substantially parallel axes and reciprocating in a pair of cylinders formed in adjacent but separate cylinder blocks, said cylinder blocks having common abutting surfaces, a crankshaft journaled with its axis in the common abutting surfaces of the cylinder block, a cylinder head closing off each of said cylinders, said cylinder blocks and cylinder heads being secured into a unitary assembly by at least two short studs and two long studs, each cylinder head being associated with a short stud and a long stud, each long stud extending through a cylinder head and the adjacent cylinder block and terminating within the opposite cylinder block, and each of the short studs extending through a cylinder head and terminating in the adjacent cylinder block, each of the short studs associated with each of the cylinder heads being opposite to a long stud associated with the opposite cylinder head.

3. A device for exchanging energy between a working fluid and at least a pair of reciprocating pistons, said pistons having substantially parallel axes and reciprocating in a pair of cylinders formed in adjacent but separate cylinder blocks, said cylinder blocks having common abutting surfaces, a crankshaft journaled with its axis in the common abutting surfaces of the cylinder blocks, a cylinder head closing off each of said cylinders, said cylinder blocks and cylinder heads being secured into a unitary assembly by at least two short fastening means and two long fastening means, each cylinder head being associated with a short fastening means and a long fastening means, each of the short fastening means associated with each of the cylinder heads being oppositely and concentrically aligned with a long fastening means associated with the opposite cylinder head, each long fastening means extending through a cylinder head and the adjacent cylinder block and terminating in the opposite cylinder block in spaced apart relationship to the short fastening means opposite thereto, each of the short fastening means extending through a cylinder head and terminating in the adjacent cylinder block.

4. A device for exchanging energy between a working fluid and at least a pair of reciprocating pistons, said pistons having substantially parallel axes and reciprocating in a pair of cylinders formed in adjacent but separate cylinder blocks, said cylinder blocks having common abutting surfaces of the cylinder blocks, a cylinder head closing off each of said cylinders, said cylinder blocks and cylinder heads being secured into a unitary assembly by at least four short fastening means and two long fastening means, each cylinder head being associated with two short fastening means and one long fastening means, each long fastening means extending through a cylinder head and the adjacent cylinder block and terminating in the opposite cylinder block, and each of the short fastening means extending through a cylinder head and terminating in the adjacent cylinder block, one of the short fastening means associated with each of the cylinder heads being oppositely and concentrically aligned with a long fastening means associated with the opposite cylinder head, and the other of said short fastening means associated with each of the cylinder heads being oppositely and concentrically aligned with each other.

5. An internal combustion engine comprising a pair of cylinders formed in adjacent but separate cylinder blocks, a pair of pistons reciprocating in said cylinders, said cylinder blocks having common abutting surfaces, a crankshaft journaled with its axis in a common plane with the abutting surfaces of the cylinder blocks, a cylinder head closing off each of said cylinders, said cylinder blocks and cylinder heads being secured into a unitary assembly by at least two short fastening means and two long fastening means, each cylinder head being associated with a short fastening means and a long fastening means, each long fastening means extending through a cylinder head and the adjacent cylinder block and terminating in the opposite cylinder block, and each of the short fastening means extending through a cylinder head and terminating in the adjacent cylinder block.

6. An opposed horizontal engine comprising a pair of cylinders formed in adjacent but separate cylinder blocks, said cylinders having substantially parallel axes, a pair of pistons reciprocating in said cylinders, each of said cylinders being disposed between a pair of walls, said cylinder blocks having common abutting surfaces including said walls, bearing means mounted in the common abutting surfaces of said walls, a crankshaft journaled in said bearing means, a cylinder head closing off each of said cylinders, said cylinder blocks and cylinder heads being secured into a unitary assembly by at least two short fastening means and two long fastening means, each cylinder head being associated with a short fastening means and a long fastening means, each long fastening means extending through a cylinder head and the adjacent cylinder block and terminating in one of the walls of the other cylinder block, and each of the short fastening means extending through a cylinder head and terminating in one of the walls of the adjacent cylinder block, said long and short fastening means associated with one cylinder head being disposed on opposite sides of a horizontal plane that includes the axis of the cylinder.

7. An opposed horizontal engine comprising a pair of cylinders formed in adjacent but separate cylinder blocks, said cylinders having substantially parallel axes, a pair of pistons reciprocating in said cylinders, each of said cylinders being disposed between a pair of walls, said cylinder blocks having common abutting surfaces including said walls, bearing means mounted in the common abutting surfaces of said walls, a crankshaft journaled in said bearing means, a cylinder head closing off each of said cylinders, said cylinder blocks and cylinder heads being secured into a unitary assembly by at least two short fastening means and two long fastening means, each cylinder head being associated with a short fastening means and a long fastening means, each long fastening means extending through a cylinder head and the adjacent cylinder block and terminating in one of the walls of the other cylinder block, and each of the short fastening means extending through the cylinder head and terminating in one of the walls of the adjacent cylinder block, said long and short fastening means associated with one cylinder head being disposed on opposite sides of a horizontal plane that includes the axis of the cylinder, the short and long fastening means associated with one of the cylinder heads being oppositely and concentrically aligned with the long and short fastening means associated with the other cylinder head.

8. An internal combustion engine comprising a pair of cylinders formed in adjacent but separate cylinder blocks, a pair of pistons reciprocating in said cylinders, said cylinder blocks having common abutting surfaces, a crankshaft journaled with its axis in a common plane with said abutting surfaces of said cylinder blocks, a cylinder head closing off each of said cylinders, said cylinder blocks and said cylinder heads being secured into a unitary assembly by at least two short fastening means and two long fastening means, each cylinder head being associated with a short fastening means and a long fastening means, each long fastening means extending through a cylinder head and the adjacent cylinder block and terminating within the opposite cylinder block, each of said short fastening means extending through a cylinder head and terminating in the adjacent cylinder block, said fastening means being substantially in a common plane transverse to the axis of said crankshaft.

9. An internal combustion engine comprising a pair of cylinders formed in adjacent but separate cylinder blocks, a pair of pistons reciprocating in said cylinders, said cylinder blocks having common abutting surfaces, a crankshaft journaled with its axis in a common plane with said abutting surfaces of said cylinder blocks, a cylinder head closing off each of said cylinders, said cylinder blocks and said cylinder head being secured into a unitary assembly by at least two short fastening means and two long fastening means, each cylinder head being associated with a short fastening means and a long fastening means, each long fastening means extending through the cylinder head and the adjacent cylinder block and terminating within the opposite cylinder block, and each of said short fastening means extending through a cylinder head and terminating in the adjacent cylinder block, said fastening means being substantially in a common plane transverse to the axis of said crankshaft, each of the short fastening means associated with each of the cylinder heads being disposed upon the same side of the axis of the cylinder as the long fastening means associated with the other cylinder head.

10. An internal combustion engine comprising a pair of cylinders formed in adjacent but separate cylinder blocks, a pair of pistons reciprocating in said cylinders, said cylinder blocks having common abutting surfaces, a crankshaft journaled with its axis in a common plane with said abutting surfaces of said cylinder blocks, a cylinder head closing off each of said cylinders, said cylinder blocks and said cylinder heads being secured into a unitary assembly by at least two long fastening means and six short fastening means, each long fastening means extending through a cylinder head and the adjacent cylinder block and terminating within the opposite cylinder block, and each of said short fastening means extending through a cylinder head and terminating in the adjacent cylinder block, said long fastening means and two of said short fastening means being substantially in a common plane normal to the axis of said crankshaft, each of said short fastening means associated with each of the cylinder heads in said normal plane being disposed on the same side of the axis of the cylinder as the long fastening means associated with the other cylinder head, the remaining four short fastening means being substantially in a common plane normal to the axis of said crankshaft and spaced from said first mentioned normal plane.

References Cited in the file of this patent

UNITED STATES PATENTS

| 2,874,534 | Canazzi | Feb. 24, 1959 |

FOREIGN PATENTS

| 312,489 | Great Britain | May 30, 1929 |
| 419,341 | Canada | June 22, 1948 |